P. RISEBOROUGH.
FARM TRACTOR.
APPLICATION FILED MAR. 10, 1917.
1,341,480.
Patented May 25, 1920.
6 SHEETS—SHEET 2.
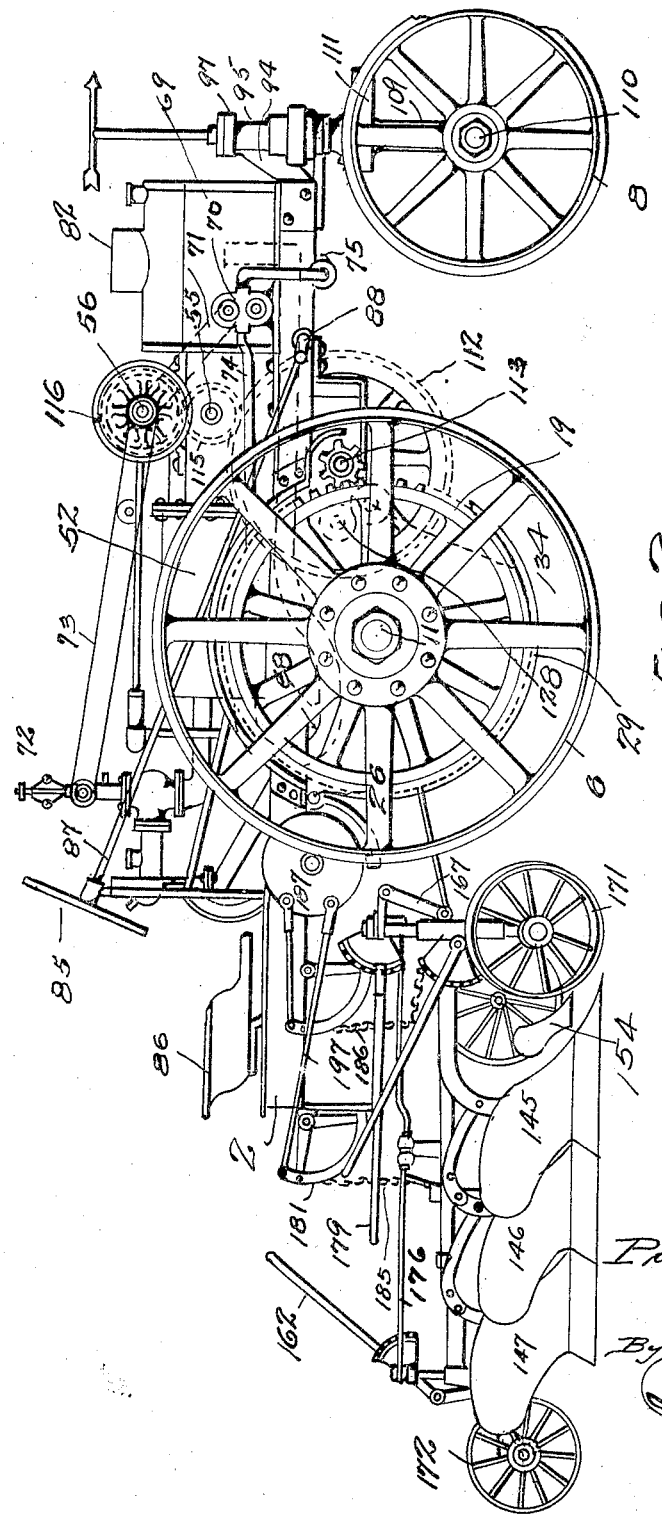
Purling Riseborough,
Inventor
Attorney

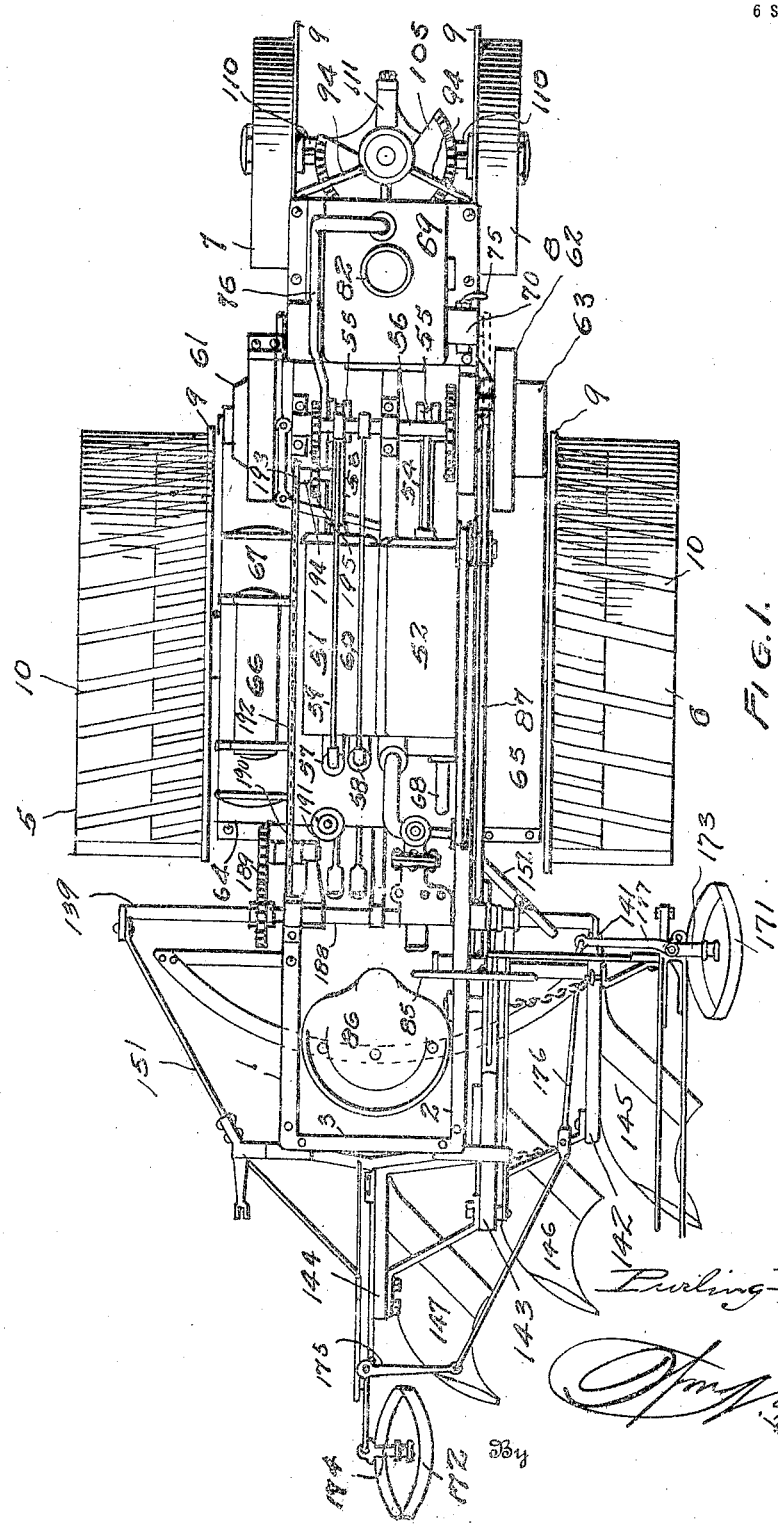

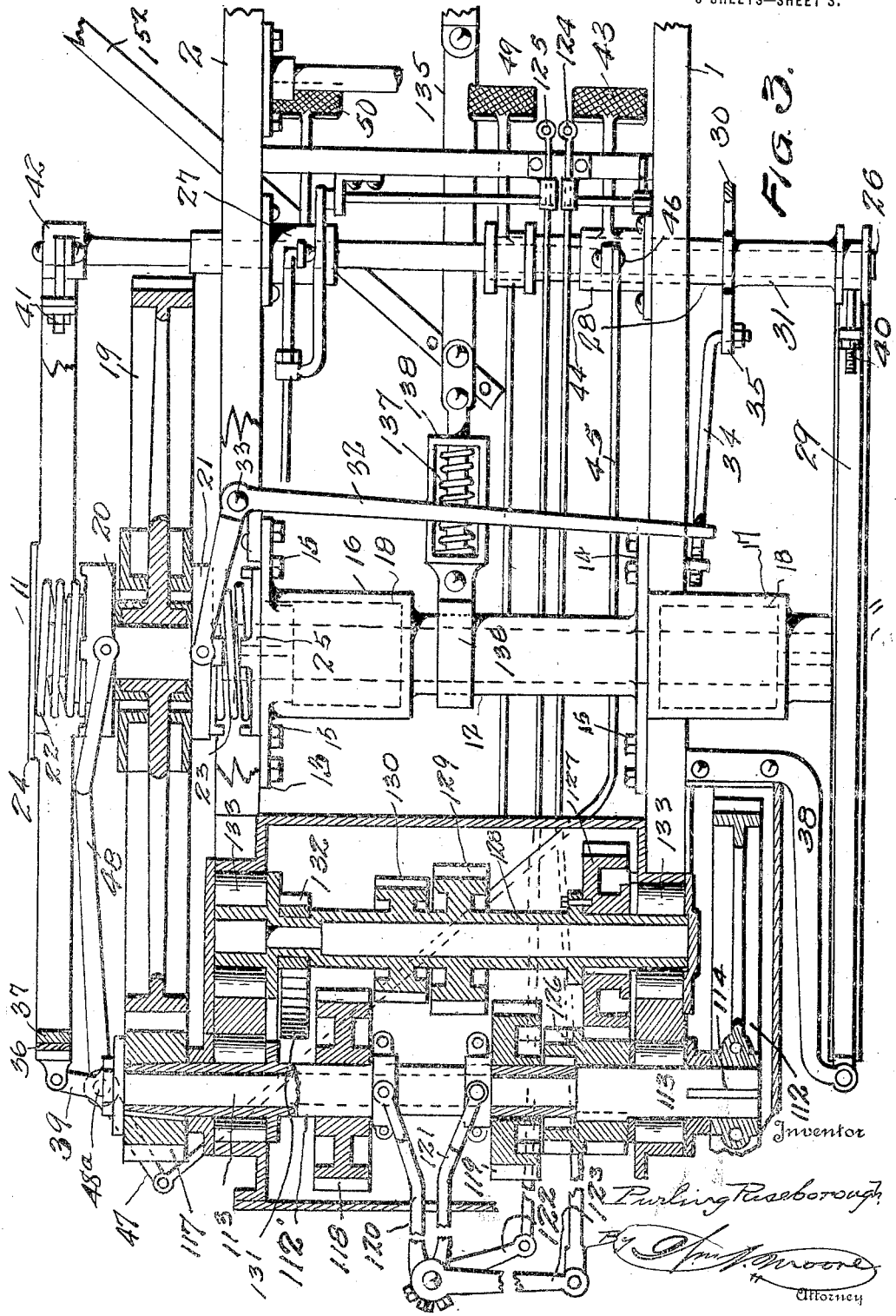

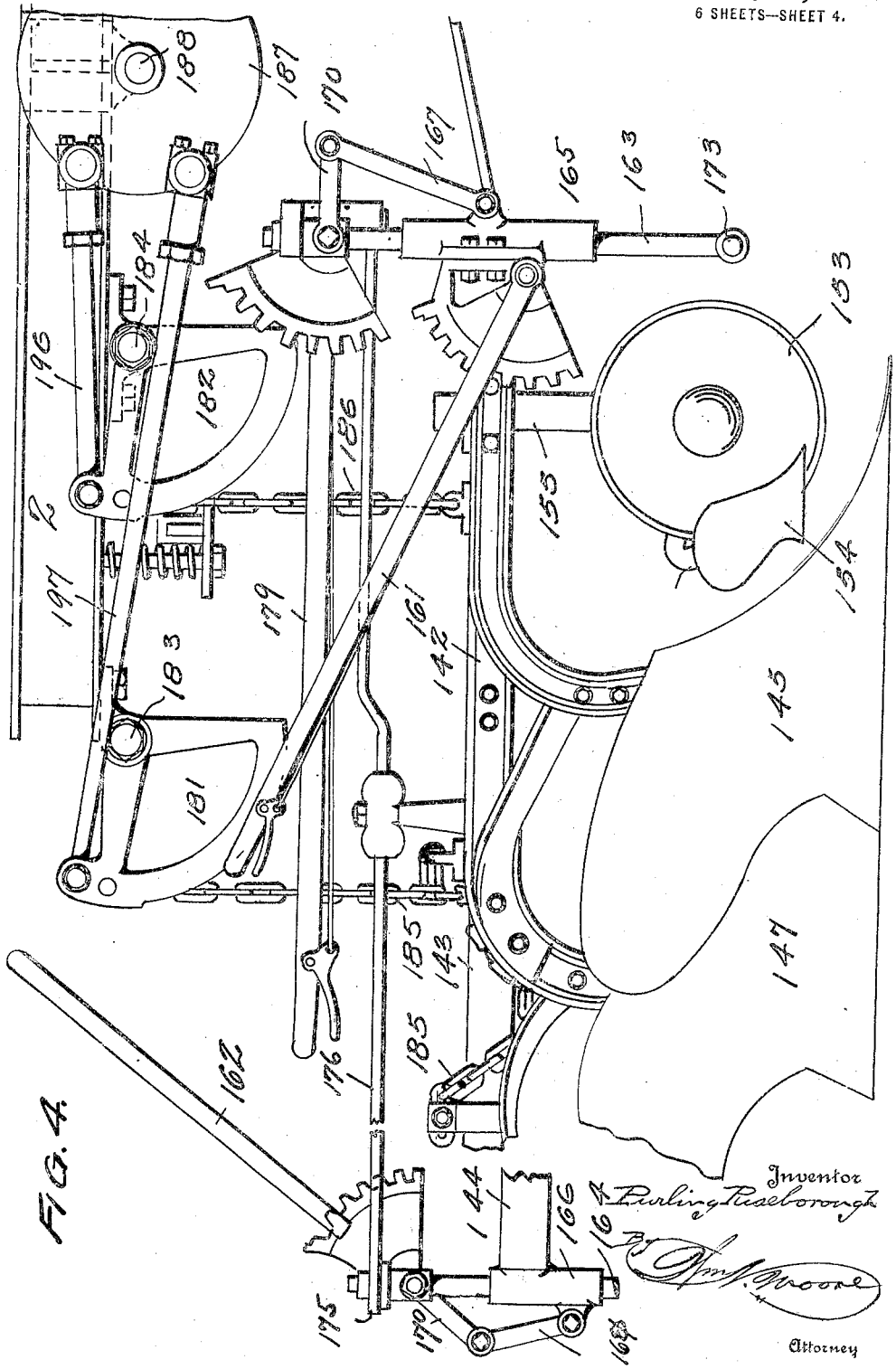

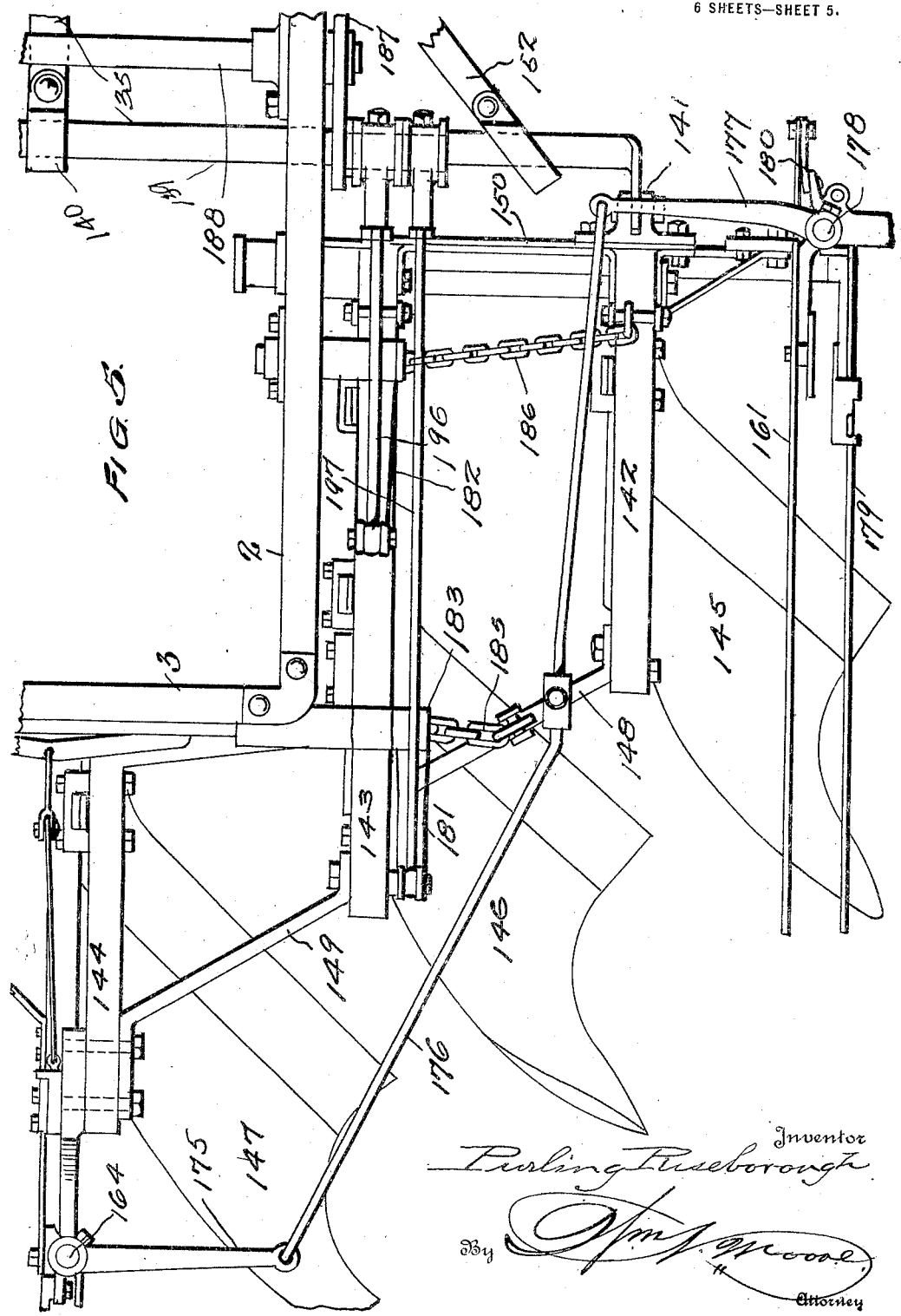

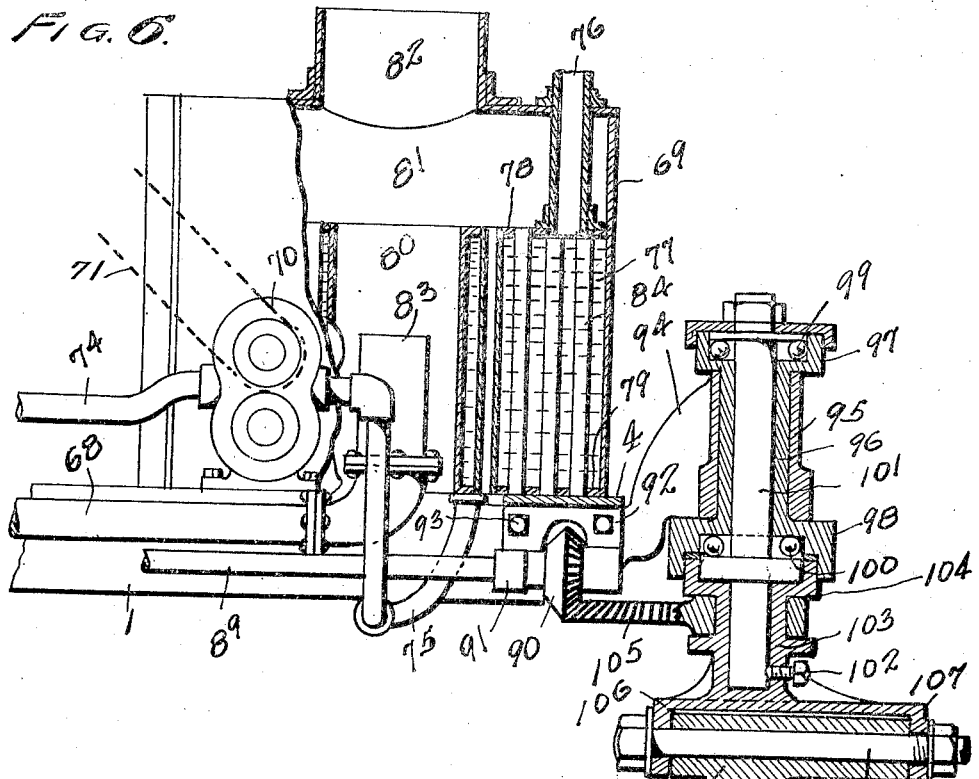
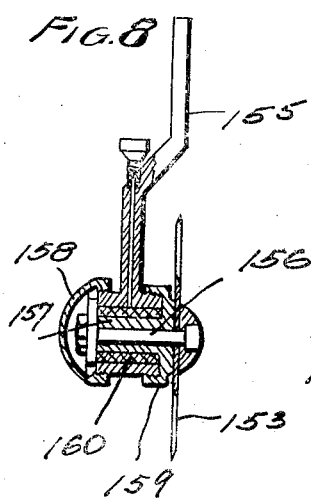
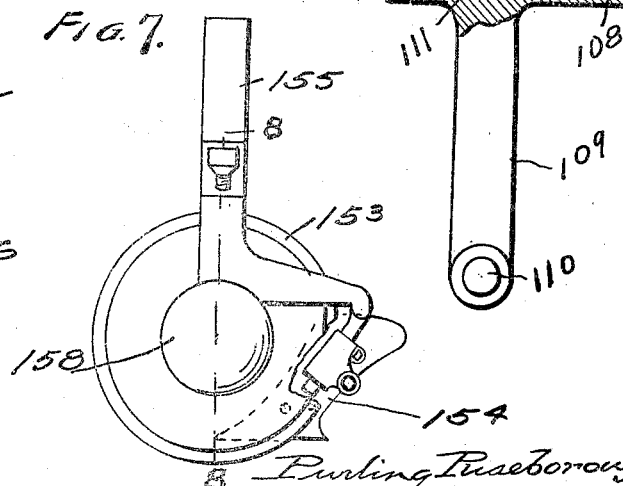

UNITED STATES PATENT OFFICE.

PURLING RISEBOROUGH, OF MONROE CENTER, ILLINOIS.

FARM-TRACTOR.

1,341,480.　　　　Specification of Letters Patent.　　Patented May 25, 1920.

Application filed March 10, 1917. Serial No. 153,886.

*To all whom it may concern:*

Be it known that I, PURLING RISEBOROUGH, a citizen of the United States, residing at Monroe Center, in the county of Ogle and State of Illinois, have invented certain new and useful Improvements in Farm-Tractors, of which the following is a specification.

The present invention relates to improvements in tractors and is designed for the purpose of providing an implement of this character adapted for use on farms for plowing, cultivating, etc., and equally well adapted for use on highways for hauling vehicles such as trailers.

The invention involves certain improved constructions and combinations and arrangements of parts pertaining to various parts of the implement and particularly to the steering apparatus, the driving means, the transmission mechanism, and numerous other features as will be hereinafter pointed out.

In the accompanying drawings I have illustrated one complete example of the physical embodiment of my invention constructed according to the best mode I have so far devised for the practical application of the principles of my invention.

Figure 1 is a top plan view of the tractor, showing the general assembly of parts and the tractor has an attachment coupled thereto embodying the use of three plows, etc.

Fig. 2 is a side elevation of the assembled view of Fig. 1.

Fig. 3 is an enlarged view, partly in section, showing the transmission mechanism of the tractor.

Fig. 4 is an enlarged, side elevation of the plow attachment of the tractor.

Fig. 5 is a top plan view of the plow attachment of Fig. 4.

Fig. 6 is an enlarged view partly in section showing the construction of the radiator, and the steering connections of the tractor.

Fig. 7 is a side elevation of the colter disk and jointer plow attachment.

Fig. 8 is a sectional view of Fig. 7 on line 8—8.

In the preferred embodiment of my invention as illustrated in the drawings, I employ a rectangular main frame preferably made up of the side beams 1, 2, the rear end cross bar 3, and the front end cross bar 4, these parts being of usual metallic construction and forming the essential supporting member of the tractor. There are four wheels, as the two rear driving wheels 5 and 6, and the two front steering wheels 7 and 8, all of the wheels being formed with annular flanges as 9 to prevent skidding, and the driving wheels fashioned with metallic plates or strips 10, 10, to increase the tractive power of the wheels.

The two driving wheels 5 and 6 are keyed and loose on their respective ends of the driving axle 11 which extends transversely of the main frame, through a housing 12 fashioned with flanges 13, 14 which are attached as by bolts 15 to the beams of the main frame or chassis. At 16 and 17 enlarged cages are formed for roller bearings as indicated by dotted lines 18, and the driving axle is of course supported in these bearings.

The drive wheels are operated from the power transmission mechanism in connection with the large gear wheel or bull gear 19, loose on the axle 11, and provided at either side with a clutch member as 20 and 21, the former for the left drive wheel 5 and the latter for the right drive wheel 6, the springs 22 and 23 being employed as usual to hold the clutches closed. The spring 22 is held between the clutch member 20 and the plate 24, and the spring 23 is retained between the member 21 and the cap plate 25, and as these are extension or protractile springs, it will be seen that the wheels 5 and 6 are normally in driving condition.

Both drive wheels may be utilized in the steering movement of the tractor and for this purpose I utilize the braking elements of the driving wheels. Each wheel is provided with a brake as indicated in Fig. 3 and the brakes are operated from the brake shaft 26 supported in bearings 27 28 attached to the side beams of the main frame, and the shaft extends transversely of the frame. The brake 29 of the left wheel 5, and its clutch, are operated through the medium of a pedal arm 30 and its sleeve 31 on the shaft 26, and through the bell crank lever 32 pivoted to the frame at 33, and the link 34 and lever arm 35, the clutch 21 may be disengaged and the brake applied. Thus, when the tractor is to turn to the left, the clutch 21 may be disengaged, the brake 29 applied, and the wheel 5 held stationary or nearly so, in order that the tractor may be turned on the wheel as a center. The band of the wheel brake for wheel 6 is indicated by the numeral 36, and 37 indicates the brake carried by the wheel 6. Both brakes are supported as usual from the frame, the brake 29 as by bracket 38 and the brake of wheel 6 being supported by bracket 39, while the usual threaded bolt couplings 40 and 41 are employed, the latter being used in connection with the sleeve 42 at the end of the shaft 26. The brake of wheel 6 is applied, and its clutch opened in manner similar to the description of the same operation of wheel 5. Thus, the pedal 43 has its sleeve 44 fixed on the shaft 26 so that the shaft will be rocked when pressure is put upon the pedal and the brake applied to wheel 6, and by means of the bent draw rod 45 connected at 46 to the sleeve and at its other end connected to an arm 47 of the lever 48 which is pivoted at 48$^a$ to a stationary member and operatively connected to the clutch member 20. Thus when the pedal 43 is depressed the clutch 20 of wheel 6 is released and its brake is applied, so that, when it is desired to turn the tractor to the right, this operation is performed, the left wheel being at the same time driven, and the tractor turns on the right wheel as a pivot. The pedal 49 is indicated as part of the connection for operating a service brake in connection with the transmission mechanism, and the clutch pedal 50 is part of the mechanism controlling the motor driving means, but as these clutches are of usual construction and operation, they are not herein illustrated.

The motive power for the tractor is supplied by the two cylinder motor of which the cylinders are designated 51 and 52 with their pistons 53 and 54 connected as usual to the crank shaft 55 which is supported transversely of the frame at the forward end thereof. Above the crank shaft and parallel therewith is the cam shaft 56 from which the valves 57 and 58 are operated as usual through the instrumentality of the valve rods 59 and 60 of the respective valves, and at the ends the crank shaft is provided with oppositely disposed fly wheels 61 and 62 and the belt pulley 63. Between the driving wheels 5 and 6 and the frame are housings 64 and 65, covering the brake devices, and at the left side of the tractor are located the gas tank 66 and the oil tank 67 for furnishing the fuel and lubricating oil to the engine or motor.

The motors are cooled by the well known principle of water circulation, and in this instance I utilize the exhaust from the cylinders to enhance the cooling of the water. For this purpose I transmit the exhaust gases from the motor through the exhaust pipe 68 toward the front of the tractor, under the motor mechanism, and into the radiator 69 for the purpose of creating an upward draft therethrough of cold atmosphere so that it may cool the water in the radiator. The water is carried or circulated from the water jacket of the motor to the radiator and return through the instrumentality of the circulation pump 70 which is actuated from the cam shaft 56 through the belt 71. Incidentally it might be mentioned here that the governor for the engine as indicated at 72 is also operated from the cam shaft through the belt 73 (Fig. 2). In Fig. 2 a pipe 74 is illustrated as connecting the pump and the water jacket of the motor or cylinder 52, while at the other side of the pump a second pipe 75 connects the pump with the bottom of the radiator 69 and enters the shell of the radiator at its bottom. Through the top of the radiator an inlet pipe 76 enters and this pipe is connected to the jacket of the cylinder 51 (see Fig. 1) thus completing the water circuit between the jackets of the two cylinders 51 and 52, through pipe 76 to the radiator, through the radiator and outlet pipe 75 and pump 70 back to the water jacket of cylinder 52 through pipe 74.

The interior of the radiator shell is formed with a water tank portion 77 closed at the top by a horizontal partition 78, and the bottom 79 of the radiator forms the bottom of the tank. Through the vertical center of the tank a tube 80 extends, opening at the bottom of the tank and also through the top or partition 78, and above the tank a canopy or space 81 is provided in the radiator from which leads the flue 82 which is located directly above and in line with the tube or pipe 80. The exhaust pipe 68 from the motor is provided with an upwardly bent end or nozzle 83 which projects into the pipe 80, and by its emission of hot gases up through the canopy and flue, creates a draft upwardly through the radiator, and to take advantage of this draft I provide a series or plurality of flues or pipes 84 arranged vertically and passing through the tank 77 opening at their lower ends below the bottom 79 and opening at their upper ends into the space 81 of the radiator. Thus the water which is contained in the tank 77, surrounds and is in contact with the flues or pipes 84, and the exhaust of heated gases through the central pipe or flue 80, space 81 and pipe 82 causes a flow of cool air upwardly through the series of flues 84 which keeps these flues cool and withdraws the heat from the water so that it may be returned after cooling, to the water jackets of the motors.

The steering gear of the tractor is operated from the wheel 85, which is located conveniently to the occupant of the seat 86, and suitable means as bar 87 and connection 88 are employed to turn the shaft or bar 89 upon which the bevel pinion 90 is carried (Fig. 6) and the shaft is supported in bearings 91 which form part of the transverse front bar or plate 4 of the frame, flanges 92 of the front plate being attached as by bolts 93 to the side beams of the frame or chassis. Formed integral with the front plate are a series of vertical webs or flanges 94 (Figs. 1 and 6) which converge and terminate in the housing 95 which is a tubular casting open at bottom and top incasing the bearing sleeve 96 which is formed with the upper and lower bearing heads 97 and 98 for the upper and lower ball bearings 99 and 100. The head portion of the steering apparatus formed by the housing 95 and sleeve 96 is stationary and within this head the post 101 turns, and with said post the two wheels 7 and 8. The lower end of the post is fixed as by set screw 102 to the tubular head 103 which has a bearing portion 104 co-acting with the head 98. This tubular head is turned from the pinion 90 through the horizontal gear 105 fixed to the tubular head, and the lower end of the tubular head is forked to form hinge portions or ears 106 107 for the hinge bolt 108. By means of this hinge bolt the axle arch 109 may rock laterally and permit the wheels 7 and 8 on the stub axles 110 to conform to irregularities in the road of travel, and the perforated head 111 of the axle arch is the center of the pivotal movement.

The transmission mechanism is illustrated in Fig. 3, and of course this mechanism is operatively connected with the driving mechanism through the instrumentality of the intermediate gear 112 which is keyed on the transverse shaft 113 by means of the key 114. The intermediate gear is revolved by the pinion 115 on shaft 55 through the gear 116 on shaft 56, and the power is transmitted to the pinion 117 keyed to the shaft 113, and so to the bull gear 19 on the axle 11. Upon the shaft 112' are two slide or shift gears 118 and 119 operated by their forks 120 and 121 through the levers 122 and 123 and the actuating rods 124 and 125 conveniently located for the driver of the tractor. The two slide gears 118 and 119 are keyed on the sleeve or hollow shaft 112' which is loose on the reduced portion of the shaft 113, and the internal teeth of the slide gear 119 are adapted to engage the external teeth of a double gear wheel 126 which is keyed to the larger end of the shaft 113 and when so engaged the tractor is driven directly at high speed. The double gear wheel 126 is at all times in engagement with the larger gear 127 which is keyed to the tubular shaft 128 lying parallel and in the same plane with the shaft 113. This tubular shaft has also a second and third gear wheel 129 and 130 formed integral therewith, the wheel 129 being adapted for engagement with the wheel 119 to drive the tractor at second speed, and the wheel 130 adapted for engagement by the wheel 118 for slow speed. For reverse movement of the tractor I employ the idle gear wheel 131 with which the small pinion 132 on the sleeve 128 engages, and to transmit the reverse movement gear 118 is moved into engagement with idle gear 131. The shafts are of course supported in roller bearings as indicated at 133 and the idle gear 131 is journaled on counter shaft 134 (Fig. 2) indicated in dotted lines.

I have illustrated in connection with the tractor a plow attachment which may be coupled to the tractor by the utilization of a draw bar 135 which has its clevis 136 attached to the housing 12 of the axle, the usual cushion spring and bracket 137, 138 being interposed for the prevention of shocks and jars and to take up vibrations.

The plow attachment involves the transverse beam 139 to which the draw bar is coupled by the slidable coupling 140, and the plow attachment *per se* is pivotally connected to the transverse draft beam by the hitch clevis 141 (see Fig. 5). The attachment comprises three plow beams as illustrated indicated as 142, 143, 144, 142 being the front plow beam, to which plow 145 is attached; the intermediate plow beam for plow 146 and the rear plow beam for plow 147, and these plow beams are connected by the rigid brace bars 148 and 149, bolts being used to make the proper connection. The front beam and the intermediate beam are also connected by means of the cross brace 150, and other suitable braces are of course employed to make the attachment rigid. A pull bar or brace 151 is extended from the draft beam 139 back to the rear plow beam, and the diagonal brace 152 connects the draft beam with the draw bar as seen in Figs. 3 and 5.

In addition to the plows, the attachment carries the disk 153 and jointer plow 154, illustrated in detail in Figs. 7 and 8, and these elements aer supported from the attachment by means of the shank 155. The bolt 156 is used to clamp the disk 153 on the sleeve 157, and the caps 158 and 159 are employed to keep out dust from the bearings 160.

The depths of the furrows made by the plows is governed by the adjusting means therefor, there being two lever mechanisms for this purpose as indicated at 161 and 162. There are two vertical posts or standards 163 and 164 upon which the sleeves 165 and 166 are adjustable through the respective links 167 and 168 and their levers 169 and 170, the posts 163 and 164 of course having their respective wheels 171 and 172 journaled on the studs 173 and 174, and the sleeves 165 and 166 being attached to or integral with part of the plow supporting frame. To steer the rear wheel 172 I utilize a lever arm 175 on the top of the post 164 which is connected by the rod 176 to the lever arm 177 on the post 178 which is supported on the frame bar 150, and by means of the lever arm 179 and connecting link 180, the lever arm 177 may be swung horizontally to impart a similar movement to the arm 175 and thus move the wheel 172 to steer or guide the plow attachment.

The entire plow attachment may be bodily lifted from operative position through the movement of two segments or arcs of wheels indicated at 181 and 182. These segments are pivoted respectively at 183 and 184 on the frame or chassis of the tractor, and they are grooved to accommodate the lift chains 185 and 186 which are attached to the lifting segments and also to the plow beams. An oscillatable disk 187 is journaled on the transverse shaft 188 supported in bearings in the frame of the tractor and this shaft and disk may be revolved through the medium of the train of gears 189 (Fig. 1) the sprocket wheel 190, sprocket shaft 191, chain 192, wheel 193 on shaft 194 and the train of gears 195 one of which is on the shaft 56, there being, of course, suitable clutch and throw off mechanism for operating the parts. The oscillatable disk is connected with the segmental grooved members by the respective connecting rods 196 and 197, so that when the disk is rotated to the right, as described, the segments are caused to swing on their pivots both swinging upwardly to the left and by their chains lifting the plow attachment upwardly so that the plows will be free of the ground and may be transported in inoperative position.

The horizontally swinging movement of both the front as well as of the rear steering wheels is necessary in order to allow the tractor to make a sharp turn when one of the side wheels is held stationary, thereby also avoiding the heavy jerking and thrusting strains and movements which would result if the front and rear wheels were not so secured. This action is also aided by mounting the rear wheels on the plow attachment.

What I claim is:—

1. In a tractor, the combination with a car frame and a rotatable post mounted on said frame, of a rotatable sleeve surrounding part of said post, means to secure said sleeve to said post, a comparatively stationary sleeve surrounding the remaining part of said post and also surrounding part of said rotatable sleeve, means to rotate said rotatable post, and a pivotally and horizontally rockable wheel frame mounted on said rotatable post.

2. The combination with the chassis of a tractor, of a bearing sleeve supported therefrom, an axle arch having a longitudinally perforated central head, a revoluble head having ears and a coupling hinge bolt passed through said ears and perforated head, a segmental gear on the revoluble head and a bevel pinion supported on the tractor chassis and engaging said gear, a post fixed to the revoluble head and projecting into the bearing sleeve, and anti-friction bearings between the post and sleeve.

In testimony whereof I affix my signature in the presence of two witnesses.

PURLING RISEBOROUGH.

Witnesses:
EARL WHITE,
WM. RISEBOROUGH.